United States Patent [19]
Chan et al.

[11] Patent Number: 5,359,156
[45] Date of Patent: Oct. 25, 1994

[54] INTEGRATED CIRCUIT FOR DIGITIZER TABLE WITH DEDICATED DIGITAL SIGNAL PROCESSOR FOR IMPROVED NOISE IMMUNITY

[75] Inventors: Sang K. Chan; Chong L. Neoh; Maisy M. L. Ng, all of Singapore, Singapore

[73] Assignee: TriTech Microelectronics International Pte Ltd, Singapore, Singapore

[21] Appl. No.: 977,681

[22] Filed: Nov. 18, 1992

[51] Int. Cl.⁵ .............................................. G08C 21/00
[52] U.S. Cl. .................................... 178/19; 345/173
[58] Field of Search ......................... 178/18, 19, 20; 340/712; 345/173, 174, 177; 364/709.11

[56] References Cited
U.S. PATENT DOCUMENTS

| | | | |
|---|---|---|---|
| 4,575,580 | 3/1986 | Jandrell | 178/18 |
| 4,631,355 | 12/1986 | Frederico et al. | 178/18 |
| 4,650,926 | 3/1987 | Nakemura et al. | |
| 4,778,951 | 10/1988 | Pepper, Jr. et al. | 178/18 |
| 4,853,443 | 8/1989 | Schlosser et al. | |
| 5,239,138 | 8/1993 | Kobayaski et al. | 178/18 |
| 5,253,187 | 10/1993 | Kaneko et al. | 178/18 X |

*Primary Examiner*—Stephen Chin
*Assistant Examiner*—Paul Loomis
*Attorney, Agent, or Firm*—George D. Saile

[57] ABSTRACT

A digital tablet of the type that multiplexes pen position signals has filtering and digitizing circuits arranged in separate channels for each of the signals that is to be multiplexed. The tablet pen is connected to receive an oscillator signal and the signal is picked up at each of the four corners of the tablet and applied to the corresponding channel. The separate channels permit the filters to be made sharper. The disclosure also includes improved circuits for processing the pen position signals.

16 Claims, 5 Drawing Sheets

INTEGRATED CIRCUIT FOR DIGITIZER TABLE WITH DEDICATED DIGITAL SIGNAL PROCESSOR FOR IMPROVED NOISE IMMUNITY

FIELD OF THE INVENTION

This invention relates to an input device for a data processor that is called a digital tablet, and more specifically it relates to an improved organization of the circuits that process a signal from the tablet.

BACKGROUND

General Features of a Digital Tablet

Digital tablets are well known, but it will be helpful to review the features and terminology that particularly apply to this invention. The user of a digital tablet positions a device called a "pen" on the tablet surface, and circuits of the tablet provide a pen position signal to an associated data processor. The tablet provides a series of position samples when the user moves the pen across the surface or while the user holds the pen in a fixed position.

The pen signal is an analog signal—the pen coordinates are represented by the amplitude of the pen signal. In the specific tablet that will be described, the pen signals are current analogues that are converted to voltage analogues. The tablet circuits digitize the analog pen position signals and send the digital coordinates to the computer.

It is a general object in this art to provide good resolution at a high sampling rate. Noise in the signal is a principal limitation to resolution and sampling rate, as will be discussed later.

General Structure of One Type of Tablet

Some tablets have a resistive layer and a user holds a pen over this layer. Commonly, a dielectric layer spaces an electrode in the tip of the pen from the resistive layer. The pen current alternates at a selected frequency and the pen electrode is capacitively coupled to the resistive layer.

The tablet is rectangular and connections for the pen current are made at each corner of the tablet. The pen current is limited by the resistance of the resistive layer, and the pen position is uniquely defined by the currents in the paths to the four corners. The resistive layer is commonly made transparent so that the tablet can mounted in front of a display. The transparent layer is commonly indium-tin oxide, and the layer is sometimes called the ITO layer.

Processing the Pen Position Signal

The analog pen signal is first converted to digital form for each corner and the digitized signals are supplied to the computer in a time multiplex sequence (because the computer operates on the four values sequentially).

Even though the signal generated at the pen is on the order of 12 volts peak to peak, the small value of the coupling capacitance between the pen tip and the sensor panel results in a pen input signal to the analog front-end receiver that is in the millivolt range at its maximum. This signal has to be extracted to the 10 to 13 bit resolution level. The situation is aggravated by three items: first, the digitizer sensor panel is in the immediate vicinity of the LCD display with all the backlight drivers active (70 kHz, 120 volts peak to peak); second, the switching power supply produces noise spikes and third, the noise is created by other electronic components within the computer. The result is that a tablet circuit needs an extremely sharp bandpass filter which extracts the tiny signal out of a sea of interference.

The Prior Art

The tablet description is based on FIG. 6 of Schlosser, U.S. Pat. No. 4,853,493, and it will be helpful to consider this reference in more detail. An oscillator 136 or 240 provides the excitation source. A driver amplifier 160–163 is connected to each corner of the tablet and picks up the oscillator current. Multiplex switches 142–145 connect each driver in sequence to apply the oscillator signal to its corner of the tablet. The other three corner connections are held at ground. A pen 134 picks up the signal and the signal is amplified by an op amp 184. An op amp 184 is a current to voltage converter. A filter circuit 196 takes out components above or below the oscillator frequency. Block 202 is an amplitude demodulator (as in an a.m. radio). Switch 206 samples this signal 218 and converts it from analog to digital form.

Nakamura U.S. Pat. No. 4,650,926 is also useful in understanding these tablets.

SUMMARY OF THE INVENTION

One object of this invention is to provide a tablet with improved filtering.

It is a general object in this art to provide a circuit that can be implemented in an integrated circuit device, and it is a specific object of this invention to avoid inductors and to use small values of resistance (the lines are shorter) and small values of capacitance (the electrode area is smaller).

In the tablet of this invention, the pen is connected to the oscillator and the tablet signal is picked up at each of the four corners. A separate channel is provided for each connection point, and many of the component circuits, including a filter, are located ahead of the output sequencer or multiplexor. Providing a separate channel for each tablet connection point provides important advantages. In the known prior art, there is only a single filter and the signals from all the four corners must time-multiplex through this filter. However, the switching from one corner to another presents a step function to the filter in the single path at the output of the multiplexor. The filter requires time to settle out from the step function, and a sharp filter that is desirable for high resolution in a tablet requires more time to settle out than a broad filter. By putting a filter in each channel according to this invention, the filter is given more time to settle out and a sharper filter can be used. Preferably these filters are implemented digitally.

This goal requires added circuits (one for each channel instead of one for the output of the multiplexor), and it is another object to provide an improved tablet in which these component circuits can be matched closely to achieve a closely matched operation for each channel.

The improved component circuits and other features of the invention will be understood from the description of the preferred embodiment.

THE PREFERRED EMBODIMENT

Figure 1:
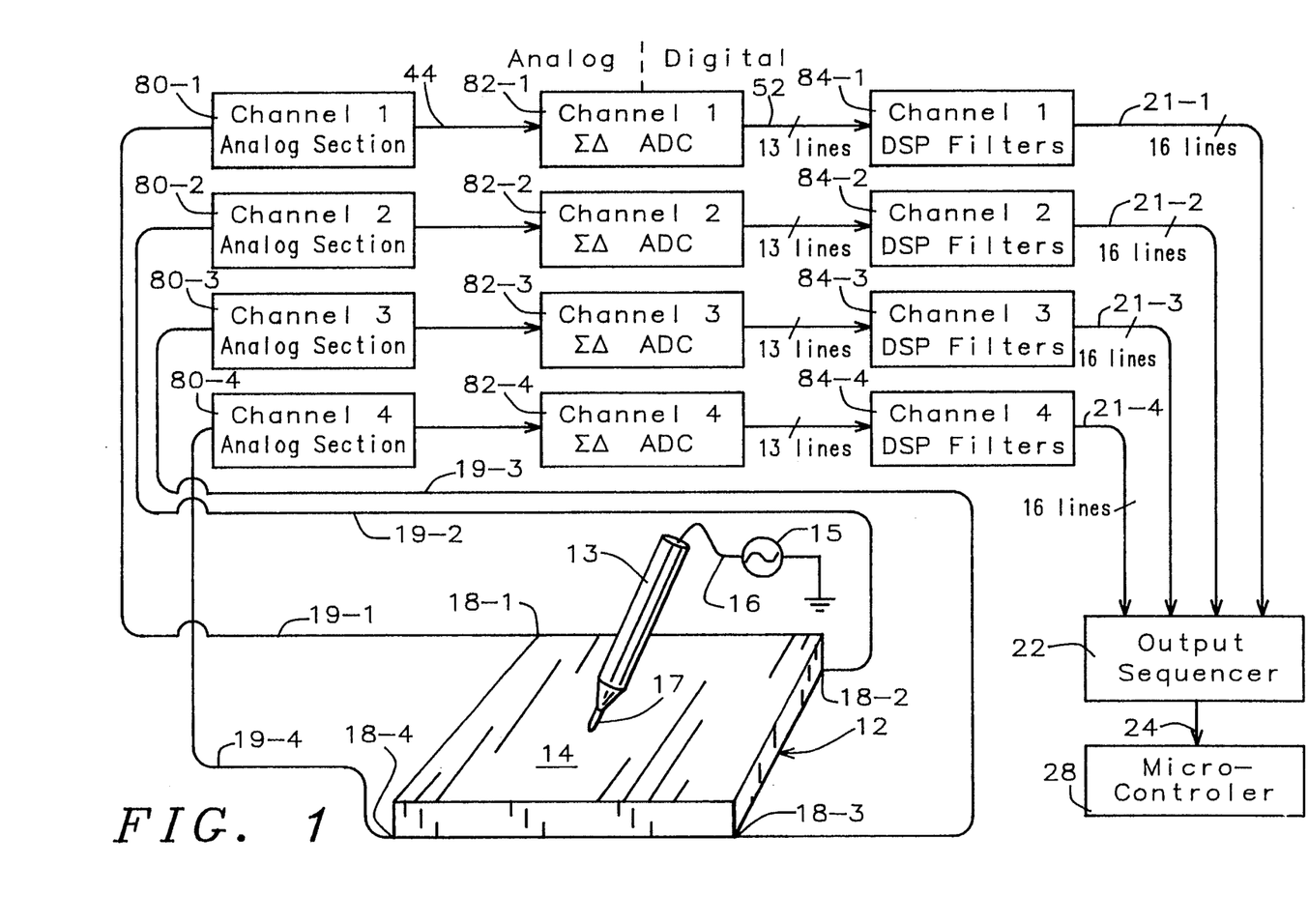
FIG. 1 is a diagram of a conventional tablet and pen and the signal processing components of the preferred tablet system of this invention.

Overview—FIG. 1

FIG. 1 shows a conventional tablet 12 and pen 13. The preferred tablet has a resistive layer and an overlying dielectric layer that form a tablet surface 14. An oscillator 15 is connected to the pen by a suitable cable 16. The pen has an electrode 17 that is capacitively coupled to the resistive layer of the tablet. The oscillator has a frequency of 100 khz to several hundred khz, as is conventional. The invention is useful with a tablet and pen of various types and these well known components will not be described in further detail.

Alternatively, the oscillator could be mounted inside the pen. The oscillator can be in the form of an integrated circuit chip which produces the sine-wave signal required by the tablet system. The advantage of this is that the pen in cordless.

Connection points 18 to the resistive layer of the tablet are located at each of the four corners. A pen signal appears at each corner 18 and a conductor 19 for each corner connection carries the pen signal. In the drawing, the corner connections and their conductors are identified individually by reference characters with a suffix -1 through -4. Components in the signal path for a corner connection will similarly be identified individually by a reference character with a suffix in the range -1 to -4 or generally by the reference character without the suffix. From a more general standpoint the tablet can be rectangular or any suitable shape, and the connections are located at points that are appropriate to establish a coordinate system on the tablet surface. They will be called "corner connections" without loss of generality.

One signal processing channel for each corner is connected to receive the pen signal at the associated corner connection 18. A channel 80, 82-84 processes the signal to remove noise and to digitize the signal but to preserve the pen position information. Each channel includes the analog section 80, the sigma-delta ADC 82, and the digital signal processing filters 84. The analog section converts the current analog signal to voltage analog, amplifies the signal and filters the high frequency noise. The sigma-delta ADC 82 then converts the analogue signal to a digital signal for further processing within the digital signal processing block 84. For example, a 13 line bus 52, connects the output of the sigma-delta ADC output to the DSP block 84. The output of the DSP block 84 connects to the output sequencer 22 for example by means of a 16 line data bus 21. The circuits of a channel are shown in FIGS. 2, 3, 4 and 5 and will be described in detail later.

It is an important feature of this invention that this signal processing takes place in separate channels (ahead of the output sequencer or multiplexor). An output sequencer 22 combines the channel outputs and produces an output on a line 24 that has digitized position signals of all lines 21-1 through 21-4 for the channels in sequence. Suitable output sequencers or multiplexors are well known and the output sequencer or multiplexor will not be described in further detail.

The microcontroller 28 performs known operations on the signal on line 24 to derive the pen position. The microcontroller 28 or a different data processor also uses this information to perform the operations that a user calls for by positioning the pen on the tablet and to control an associated display.

Figure 2:
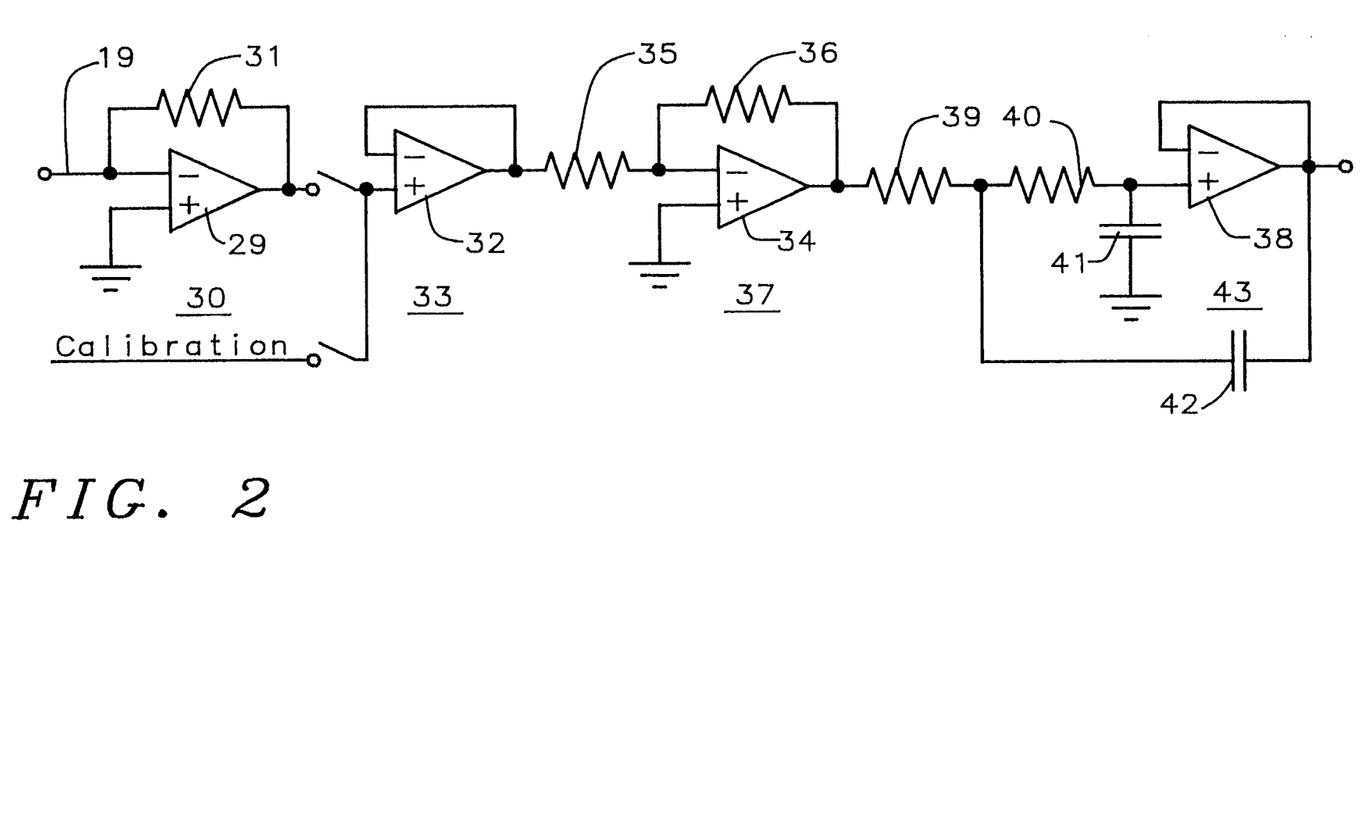
FIG. 2 shows the analog input circuits of a channel of FIG. 1.

The Signal Channel—FIG. 2

Figure 3:
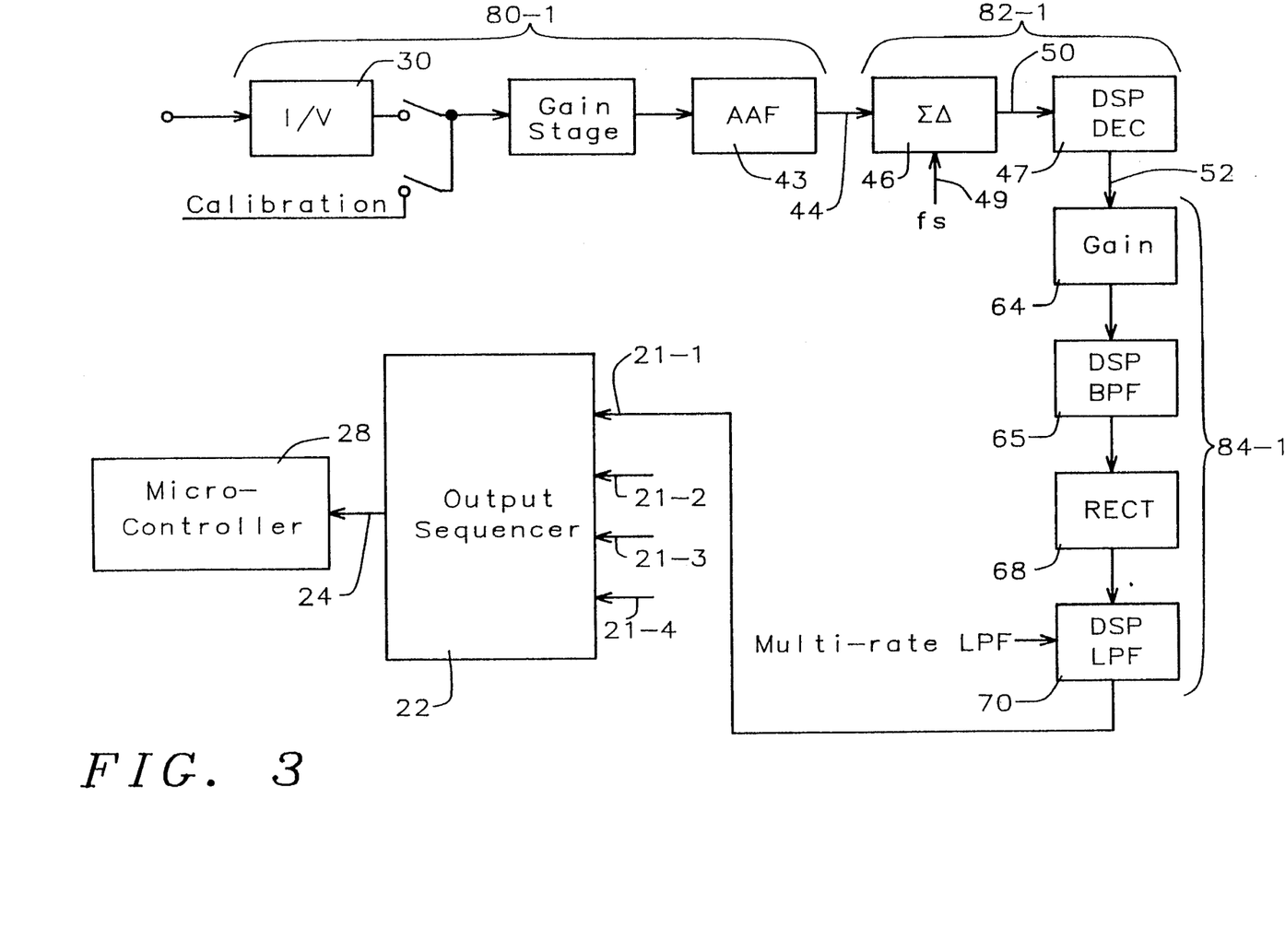
FIG. 3 shows the channel circuits, inching the circuits of FIG. 2 in block form, the sigma-delta analog-to-digital converter, and other circuits that process the tablet signal.

The components of FIG. 2 form part of a channel and they are shown again in block form in FIG. 3. An op amp 29 and a feedback resistor 31 forms a known current to voltage converter 30. A sinusoidal input current on a line 19 is applied to the inverting input, and the op amp produces an output voltage that is a function of this current. The feedback resistors 31 are matched for the four channels.

An op amp 32 forms a standard buffer 33. Note that the input can be switched to the output of the first op amp for normal operation or to a calibration input for calibration. The calibration input establishes the same nominal input signal for each channel. If the channels are not identical, their outputs to the microprocessor 28 will differ during calibration, and the microprocessor can use this difference in later calculating the pen position.

An op amp 34 is connected with an input resistor 35 and a feedback resistor 36 to form a conventional negative feedback amplifier 37. The output voltage is an inverted function of the input voltage (from the buffer) and the ratio of the resistors. Resistors 35 and 36 are preferably formed of polysilicon and are adjusted during manufacture for the desired gain.

An op amp 38 is connected with resistors 39, 40 and capacitors 41, 42 to form an anti-alias filter 43. An anti-alias filter removes high frequencies in the signal that could otherwise interact with the sampling frequency (in the sigma-delta modulator 46). The preferred filter is a second order Sallen-Key low-pass filter; see Millman and Grabel, *Microelectronics,* McGraw-Hill, 1987, pages 739–743.

The Signal Channel Continued—FIG. 3

FIG. 3 shows the components for channel 80, 82 and 84. All four channels are identical, and channels 80, 82, 84-2, 80, 82 84-3 and 80, 82, 84-4 are indicated in FIG. 3 by their output lines 21-2, 21-3 and 21-4. FIG. 3 repeats in functional block form the current to voltage converter circuit 30, block I/V, blocks 33 and 37 shown collectively as a block Gain Stage, and the anti-alias filter 43 that are shown in circuit level detail in FIG. 2.

The Sigma-Delta Modulator and the Decimator

A switched-capacitor sigma delta modulator 46 and a decimator 47 DSP DEC convert the analog sine wave at the output of the anti-alias filter 43 to a signal on line 52. This signal is a polarity alternating, sine-like signal but the amplitude has discrete digitized values so that the waveform is stair-stepped. The digitized values of the amplitude steps make the signal on line 52 significantly immune to noise in the same sense that binary signals are immune to noise that is inherent in any electronic circuits.

The sigma-delta modulator produces a series of pulses that have binary levels ("up" and "down") and have an up time that is proportional to the amplitude of the signal at the input. For example, the output is a series of progressively wider up level pulses as an unswitched sine wave nears its positive peak, and conversely it is a series of progressively wider down level pulses as the unswitched wave nears its negative peak. These pulses have a frequency $f_s$ which is established by the switching signal on line 49, as will be explained in the description of FIG. 4.

The DSP DEC 47 receives the binary valued pulses on line 50 and produces an output 52 with a reduced frequency and with the alternating polarity that has been described. The output 52 then goes to the block 84 which will be described later.

Figure 4:
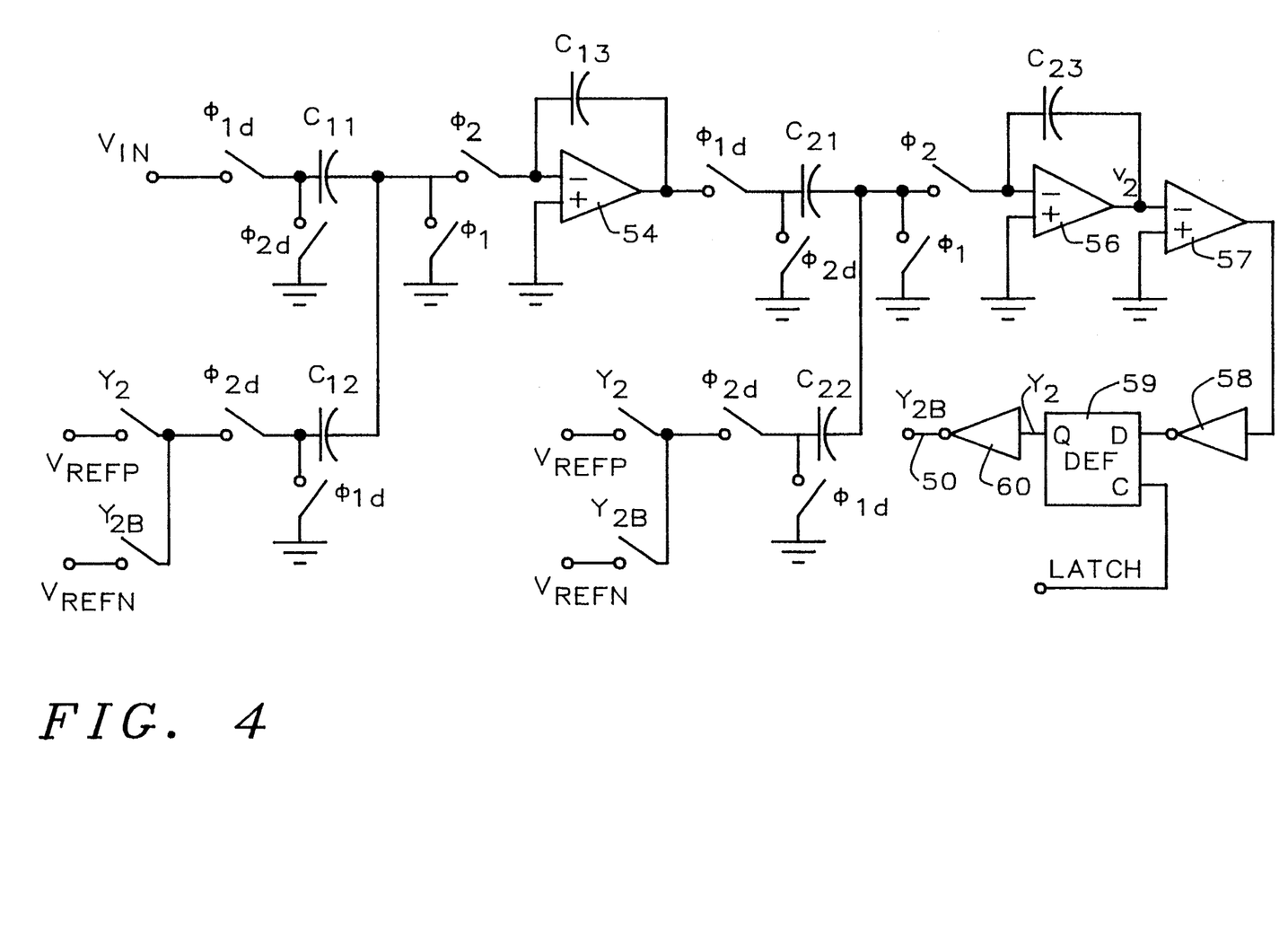
FIG. 4 is a circuit diagram of the sigma-delta modulator shown in block form in FIG. 3.

The Sigma-Delta Modulator Circuit—FIG. 4

Circuits of this general type are well known. See Rosert and Wodey, *IEEE Journal of Solid State Circuits*, vol. 23 No. 6. The signal VIN on the left in FIG. 4 is the output 44 of the anti-alias filter and the signal Y2b on the right is the input 50 to the decimator. An op amp 54 is connected with capacitors C11 and C13 and switches to form an integrator. An op amp 56 is similarly connected to form an integrator. The circuit is preferably a second order sigma-delta modulator. Other orders of modulator could be used.

An amplifier 57 produces a binary output: the signal is either high or low. Amplifier 57 is followed by an inverter 58 so that the polarity of the output is the same as the polarity at V2. A D-type latch 59 receives the output of inverter 58. An inverter 60 produces the output on line 50 from the output of the latch.

Sample Timing and Operation

The sampling switches operate from timing signals denoted $\phi 1$, $\phi 1d$, $\phi 2$, and $\phi 2d$. The sampling frequency of these switches is many times higher than the Nyquist sampling rate, (in relation to the pen signal frequency), and in a preferred embodiment is 12 mHz.

Switching waveform $\phi 1d$ and $\phi 2d$ rise (the switches close) with waveforms $\phi 1$ and $\phi 2$ respectively but they fall slightly after $\phi 1$ and $\phi 2$ fall. This delay assures that the switches at the inverting inputs to the op amps are opened before the other switches are opened. Switching waveforms $\phi 1$, $\phi 1d$ are non-overlapping with waveforms $\phi 2$, $\phi 2d$.

During the first phase ($\phi 1$ and $\phi 1d$ are up and the associated switches are closed) the analog input is sampled and the charge is stored in capacitor C11. Similarly, V1, the output of op amp 54, is sampled by capacitor C21. These timing signals are the same for each channel to avoid timing-related errors. On the fall of $\phi 1$, the output of the comparator is latched into the D-type latch.

The latch output Y2 and its complement Y2B are used to select the proper feedback voltage, VREFP or VREFN, as will be understood from the legends in the drawing. During phase 2 ($\phi 2$ and $\phi 2d$ are up) the two op amps 54, 56 integrate the charges in C11 and C21, multiplied by the values from the feedback loops.

The digital signal processor decimator (DSP DEC)—FIG. 3 continued

The output of the sigma-delta modulator is clocked into a row of shift registers which are part of a digital finite-impulse response (FIR) filter. The preferred filter is a sinc cubic filter and can be described by the following z-transform equation.

$$H(z) = \left( \sum_{i=0}^{N-1} z^{-i} \right)^M$$

The term N is the filter length and M is the finite filter order. The output of the filter is sampled at a lower rate, for example 500 khz to form the signal on line 52.

Figure 5:
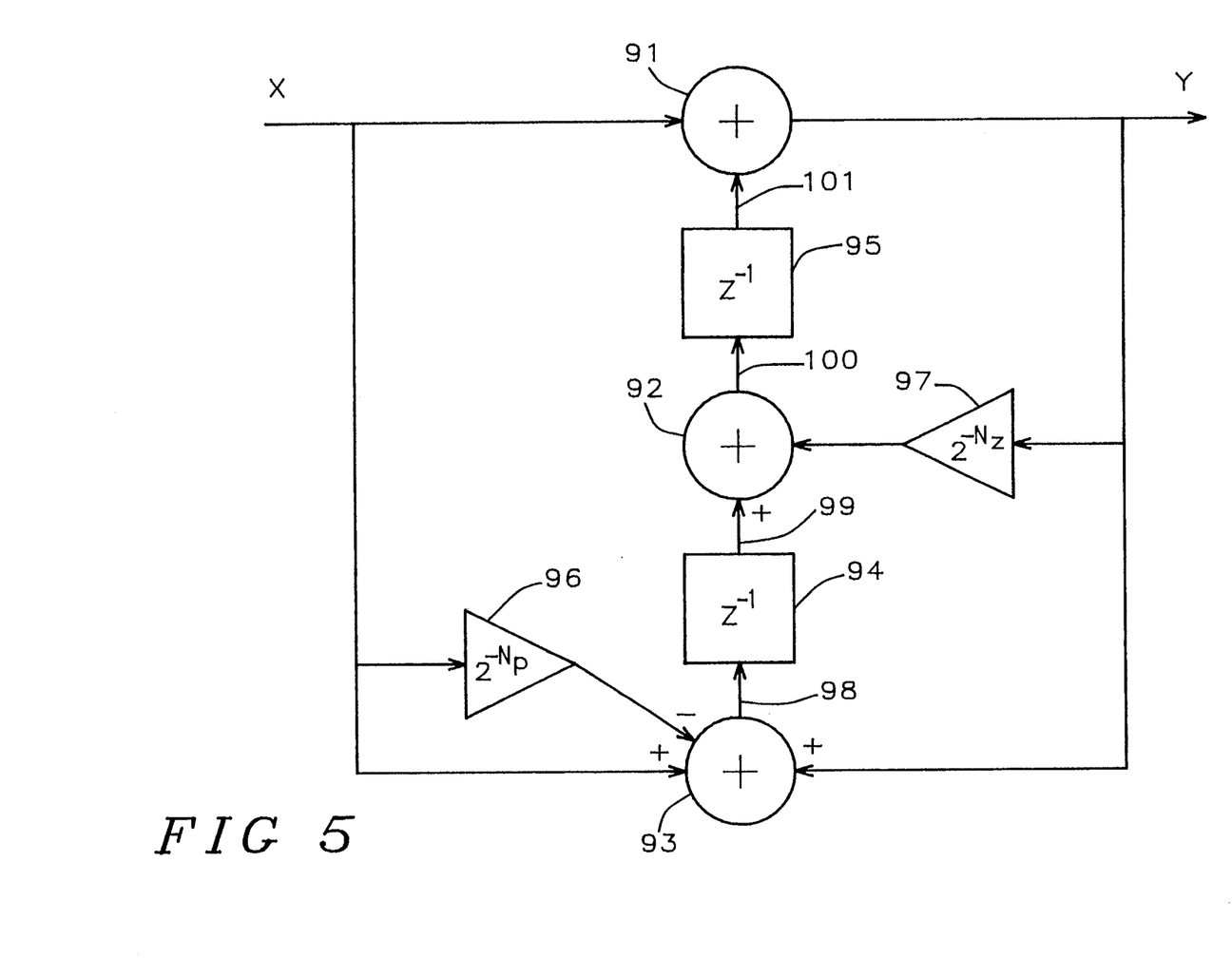
FIG. 5 shows a block diagram of the preferred structure of a second-order bandpass filter using only shifters and adders.

The Other Signal Processing Circuits—FIGS. 3 and 5

A circuit 64 provides gain for the output 52 of the decimator. A digital band pass filter 65, block DSP BPF (digital signal processor band pass filter), removes extraneous frequencies and extracts the frequency of interest from the output of the gain stage 64. Since the data rate into the DSP BPF is at a very high speed (for example about 0.5 Mhz), the signal processing circuit should be designed as efficient as possible.

A preferred band pass filter 65 can be described by the following equation.

$$H(z) = \frac{(1 + 2^{-N_z} z^{-1} + z^{-2})}{1 + (1 - 2^{-N_p}) z^{-2}}$$

The above equation can be implemented very efficiently using power-of-two coefficient filters. FIG. 5 shows the arithmetic operations required to implement the equation above.

The input and output to this second-order band pass filter are X and Y respectively. The symbols 91, 92 and 93 represent a summation operation within the digital processor BPF. Symbols 94 and 95 represent unit time delay between successive data inputs. Symbols 96 and 97 represent a left shift operation to the binary representation of the input X and output Y. The number of left shifts are represented by the values given in Np and Nz. For example, if Np is equal to 2, the binary representation of input X would be shifted left by 2 bit position.

The complete band pass filter is made out of a cascade of several second-order band pass filter as shown in FIG. 5. The operations of such a standard second-order band pass filter would be understood by those working in the field of digital signal processing.

However, it is thought to be helpful to give the following short description of the operation of FIG. 5. Firstly, the input data X is added with the data at 101 to produce the output data Y. The data 101 is produced by the following operations.

Input data X also goes to two other paths, one through the shifter 96 and another straight to the adder 93. The shifted value of X is subtracted from X and then added to the feedback of Y within the add operation 93. The output 98 from this add operation 93, is delayed by one sample delay to produce data at 99. In the add operation 92, the data 99 is added to the output data Y which has been shifted left by Nz bit positions. The output 100 from the add operation 92 is delayed by one sample delay to produce 101.

With all these arithmetic operation, the pen signal of interest will be extracted from the sea of interferences or interfering frequencies. Note that this preferred implementation is efficient because it does not require any multiplications. This is important because a hardware multiplier is slow and takes up a lot of expensive silicon integrated circuit area.

The center frequency of this band pass filter is at ¼ of the sampling frequency. Preferably, two or more zeros are placed at d.c. and at Fs/2 to attenuate noise away from the band pass.

The filtered output from the band pass filter is then "full-wave rectified" within the rectifier 68. A rectifier circuit 68, block RECT, converts the negative half of this wave to positive polarity. The operation is analogous to the detector for an amplitude modulated radio signal.

A low pass filter 70, block DSP LPF, averages the output of the rectifier circuit to form a signal that varies in amplitude with the pen position. The rectified signal has a direct current (d.c.) component and even harmonics. Because it is difficult to implement sharp and narrow low pass filtering at high frequencies, the filter is preferably a multi rate low pass filter (as indicated by the input, multi-rate LPF); a course and a wide-band filter is followed by a second filter at a much lower sampling rate. Block 70 also has conventional circuits that convert this amplitude signal to digital code that forms the signal on line 21-1 which is supplied to the output sequencer 22. For simplicity, we have illustrated only 21-1 channel output. The other 3 channels are identical to the channel 1 described above, and their outputs are indicated by line 21-2, 21-3 and 21-4.

The output sequencer 22 receives 4 sets of 16-bit data one set from each channel) and then sends these data out serially on line 24 to the microcontroller 28.

Tracing the Signal and Noise

The circuit can be summarized by tracing the signal from the pen to the microcontroller. At each connection point the signal has the frequency of the oscillator and it has a current amplitude that is established by the voltage of the oscillator and the resistance in the path from the pen to the connection point. Since the resistance of the path from the pen position to the connection is a measure of the path length, the current amplitude represents the path length.

The I/V converter changes the oscillatory current to an oscillatory voltage that carries the equivalent information about the path length. The anti-alias filter removes high frequencies that would otherwise interact with the sampling frequency to produce noise. Up to this point in the circuit, the analog signal of interest has a frequency of a few hundred khz.

The output of the sigma-delta modulator is a series of binary valued pulses (0 or 1) at the sampling frequency which contains the digitized information of the input signal. The succeeding DSP DEC block increases the word-length of the digital representation of the input signal and at the same time reduces the output data rate. This component is then followed by the DSP BPF which further removes all noise components and extracts the input sinewave. The output is a digitized representation of the input sinewave alone with very little residue noise. The RECT and DSP LPF rectify the signal and extract the dc component respectively. As a result, the output of the DSP LPF is a digital code representation which is proportional to the amplitude of the input sinewave signal excluding the noise.

OTHER EMBODIMENTS

Those skilled in the art will recognize that the tablet can be implemented with various known component circuits and that the preferred component circuits will be useful in many applications for the invention.

We claim:

1. A tablet of the type that multiplexes pen signals from a plurality of connection points (18) to the tablet, the connection points being spaced apart to define a coordinate system for the tablet surface, and circuits forming a channel (80, 82 and 84) for each tablet surface connection point, wherein the improvement comprises,
   an analog processing section (80-1) in each channel connected to an associated connection point of the tablet to receive the corresponding pen signal and producing an analog output,
   a sigma-delta modulator section (82-1) in each channel connected to receive the output of the analog processing section and producing an alternating polarity signal having digitized values,
   digital filter means (84-1) in each channel connected to receive the output of the sigma-delta modulator section and producing a filtered digital output,
   and an output sequencer (22) for combining the digital signals (21-1, 21-2, 21-3, 21-4) from the digital filter means for each channel onto a common line (24).

2. The tablet of claim 1 wherein the sigma-delta modulator section includes a sigma-delta modulator connected to receive the output of the analog processing section and a decimator connected to receive the output of the sigma-delta modulator and forming the alternating polarity signal.

3. The tablet of claim 2 wherein the means for filtering comprises a digital finite-impulse response filter (47).

4. A tablet (12) for operation with a data processor (28), comprising,
   a resistive layer associated with a tablet surface (14),
   a pen (13) having an electrode (17) positionable on the tablet surface,
   an oscillator (15) and means (16) connecting the oscillator to the pen electrode, whereby the output of the oscillator is coupled to the resistive layer of the tablet when the pen is positioned on the tablet surface,
   a plurality of connection points (18) to the resistive layer of the tablet, the connection points being spaced apart to define a coordinate system for the tablet surface,
   a circuit (80, 82, 84) for each tablet surface connection point for forming a digital signal (21) representing the position of the pen with respect to the associated connection point, comprising,
      a current to voltage converter for forming a voltage signal from the current at the associated corner connection,
      means for producing a binary valued output at a sampling frequency, and
      means for converting the binary valued outputs to a digitized polarity varying signal at a selected frequency,
   and an output sequencer (22) for combining the digital signals (21-1, 21-2, 21-3, 21-4) from each channel onto a common line (24).

5. The tablet of claim 4 wherein the means for producing a binary valued outputs at a sampling frequency includes a sigma-delta modulator connected to operate at the sampling frequency.

6. The tablet of claim 5 wherein each circuit (80, 82, 84) for forming a digital signal includes
an anti-alias filter (43) connected to supply the input to the sigma-delta modulator.

7. The tablet of claim 6 wherein the sigma-delta modulator is connected to produce a signal at the sample frequency that varies in width according to the amplitude of the sinusoid at the output of the anti-alias filter.

8. The tablet of claim 7 wherein the sigma-delta modulator includes a switched-capacitor integrator for sampling the signal from the anti-alias filter.

9. The tablet of claim 8 wherein the sigma-delta modulator is a second order sigma-delta modulator.

10. The tablet of claim 9 wherein each circuit for forming a digital signal includes
means connected to the output of the sigma-delta modulator (46) for producing a polarity varying signal having an amplitude varying in discrete steps.

11. The tablet of claim 10 wherein the means connected to the output of the sigma-delta modulator includes
a decimator for producing the signal with a lower frequency than the sample frequency.

12. The tablet of claim 11 wherein a channel includes
a band pass filter (65) for the polarity varying signal which is connected to the output of said decimator.

13. The tablet of claim 12 wherein the means for processing the signal at the output of said band pass filter includes
means for rectifying the polarity varying signal.

14. The tablet of claim 13 wherein a channel includes
a low pass filter for averaging the rectified signal and thereby producing a polarity-invariant signal that varies in amplitude with the pen position at each corner.

15. The tablet of claim 14 wherein a channel includes
means for forming a binary code according to the amplitude of the polarity-invariant signal for each corner.

16. A tablet of the type that multiplexes pen signals from a plurality of connection points (18) to the tablet, the connection points being spaced apart to define a coordinate system for the tablet surface, wherein the improvement comprises,
an analog processing section (80-1) in each channel connected to an associated connection point of the tablet to receive the corresponding pen signal and producing an analog output,
a sigma-delta modulator in each channel connected to receive the output of the analog processing section and producing a binary valued output, and a decimator connected to receive the output of the sigma-delta modulator and producing an alternating polarity signal having digitized values,
digital finite-impulse response filter means (84-1) in each channel connected to receive the output of the sigma-delta modulator section,
and an output sequencer (22) for combining the digital signals (21-1, 21-2, 21-3, 21-4) from the digital filter means for each channel onto a common line (24).

* * * * *